United States Patent [19]

Lovine et al.

[11] Patent Number: 5,061,396

[45] Date of Patent: Oct. 29, 1991

[54] DETERGENT COMPOSITIONS CONTAINING POLYETHER POLYCARBOXYLATES

[75] Inventors: Carmine P. Lovine, Bridgewater; Rama S. Chandran, South Bound Brook; Ingrid Brase, Cranbury; John C. Leighton, Flanders, all of N.J.

[73] Assignee: National Starch and Chemical Investment Holding Corporation, Wilmington, Del.

[21] Appl. No.: 422,362

[22] Filed: Oct. 16, 1989

[51] Int. Cl.[5] ........................ C11D 3/37; C08F 22/06; C08F 22/16

[52] U.S. Cl. .......................... 252/174.24; 252/174.18; 252/174.17; 252/DIG. 2; 252/DIG. 14

[58] Field of Search ...................... 252/174.24, 174.25, 252/546, 174.18, 174.17, DIG. 14, DIG. 2

[56] References Cited

U.S. PATENT DOCUMENTS

| | | | |
|---|---|---|---|
| 3,534,067 | 10/1970 | Rempfer et al. | 260/347.3 |
| 3,954,858 | 5/1976 | Lamberti et al. | 252/142 |
| 3,985,670 | 10/1976 | Berg et al. | 252/117 |
| 4,072,622 | 2/1978 | Kuhling et al. | 252/179 |
| 4,083,794 | 4/1978 | Lee et al. | 252/559 |
| 4,647,396 | 3/1987 | Denzinger et al. | 252/174.24 |
| 4,663,071 | 5/1987 | Bush et al. | 252/174.19 |
| 4,755,319 | 7/1988 | Smolka et al. | 252/174.25 |
| 4,783,282 | 11/1988 | Smid | 252/546 |
| 4,915,854 | 4/1990 | Mao et al. | 252/545 |

FOREIGN PATENT DOCUMENTS 272661 10/1989 German Democratic Rep. .

OTHER PUBLICATIONS

Gaylord, N. G., et al., *J. Macromol. Sco.-Chem.*, A6(1), 1459–1480 (1972).

Gaylord, N. G., et al., *J. Poly. Sco.,:Poly.Chem. Ed*, 16:1527–37 (1978).

Butler, G., *J. Macromol. Sci.-Chem.*, A4(1) 51–63 (1970).

*Primary Examiner*—Prince E. Willis
*Assistant Examiner*—J. Silberman
*Attorney, Agent, or Firm*—Mary E. Porter; Edwin M. Szala

[57] ABSTRACT

This invention provides detergent compositions, particularly liquid compositions, utilizing builders selected from the group consisting of a) polyether polycarboxylate compositions derived from polymers of furan/-maleic anhydride copolymers; or b) polyether polycarboxylate compositions derived from polymers comprising furan, maleic anhydride and at least one copolymerized comonomer, selected from the group consisting of alkenyl alkyl ethers, alkyl acrylates, alkenyl carboxyalkyl ethers, vinyl esters of carboxylic acids, unsaturated carboxylic acids, unsaturated dicarboxylic acids and their anhydrides and esters, olefins and furan; c) polymers comprising furan, maleic anhydride, and at least one copolymerizable comonomer other than furan and maleic anhydride, which polymers may be intermediates in the production of the polyether polycarboxylate compositions by oxidation of the intermediate polymers; and d) combinations thereof.

10 Claims, 3 Drawing Sheets

DETERGENT COMPOSITIONS CONTAINING POLYETHER POLYCARBOXYLATES

BACKGROUND OF THE INVENTION

This invention relates to detergent compositions, particularly liquid compositions, utilizing a builder selected from the group consisting of polyether polycarboxylate compositions which are oxidized copolymers of furan and maleic anhydride; other polyether polycarboxylate compositions prepared by oxidizing polymers of furan, maleic anhydride, and at least one copolymerizable comonomer, selected from the group consisting of alkenyl alkyl ethers, alkyl acrylates, alkenyl carboxyalkyl ethers, vinyl esters of carboxylic acids, unsaturated carboxylic acids, unsaturated dicarboxylic acids and their anhydrides and esters, olefins and furan; and terpolymers of furan, maleic anhydride, and at least one copolymerizable comonomer other than furan and maleic anhydride, selected from the above group, which terpolymers may be intermediates in the production of the polyether polycarboxylate compositions. These polymers may also be used as anti-redeposition agents, chelating agents, dispersants, scale inhibitors and, in a variety of other applications which require hardness sequestration or crystal modification (e.g., dentrifrices).

Detergent compositions are generally a blend of a surfactant(s), builder(s) and, optionally, ion exchanger(s), filler(s), alkali(es), anticorrosion material(s), antiredeposition material(s), bleach(es), enzyme(s), optical brightener(s), fragrance(s) and other components selected for particular applications.

Builders are used to improve the effectiveness of detergent compositions and thereby improve their whitening powers. Polyphosphate compounds, such as sodium tripolyphosphate, have long been in use as builders, particularly because of their relatively low cost and their utility in increasing the whitening powers of detergent compositions. It is theorized, however, that the presence of these polyphosphates tends to contribute to the growth of algae in lakes and rivers to a degree sufficient to cause eutrophication of these waters. For many years there has been legislative pressure to lower or discontinue their usage completely in detergent compositions to control phosphate pollution. Thus, detergent manufacturers continue to search for effective, nonphosphate detergent builders.

The manner in which detergent builders improve the cleaning powers of detergent compositions is related to a combination of factors such as emulsification of soil particles, solubilization of water insoluble materials, promoting soil suspension in the wash water so as to retard soil redeposition, sequestering of metallic ions, and the like.

Alternatives for sodium tripolyphosphate are widely used by detergent formulators. Many materials are or have been used as builders in detergent formulations. All have one or more drawbacks that offset their value in the formulations. Compositions and materials change frequently as formulators attempt to improve performance of cleaning while offering greater convenience in handling as well as keeping materials cost as low as possible.

Detergent builders for liquid detergents must be effective, compatible with the liquid formulation and shelf-stable. Builders which precipitate from the liquid, or cloud or gel the liquid, or cause phase separation, initially or upon storage, are not suitable for use in liquid detergents. In contrast, powdered detergent formulations have less demanding requirements for builder compatibility and stability.

Among the materials that have been suggested for use as detergent builders are furan/maleic anhydride copolymers. The utility of 1:1 copolymers of maleic anhydride and ethylene or propylene or fûran as co-builders agents in various detergent compositions is disclosed in U.S. Pat. No. 4,647,396, issued Mar. 3, 1987 to Denzinger, et al.

A process for preparing cleaning agents which employs a 1:1 copolymer of furan and maleic anhydride is disclosed in U.S. Pat. No. 4,755,319, issued July 5, 1988 to Smolka, et al. This copolymer and ethylene or propylene copolymers of maleic anhydride are taught to be useful sequestrants in automatic dishwasher detergent compositions that contain a calcium binding silicate.

Detergent builders comprising ether carboxylate salts (i.e., tartrate monosuccinate and disuccinate salts) are disclosed in U.S. Pat. No. 4,663,071, issued May 5, 1987 to Bush, et al. These builder compositions have the structures:

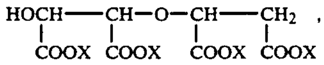
, and

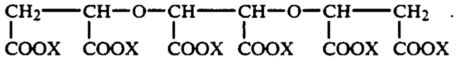
.

Notwithstanding the existence of the foregoing types of detergent builders, there remains a continuing need to identify additional non-phosphorus sequestering agents, such as the polyether polycarboxylate compositions and furan/maleic anhydride (F/MA) terpolymers disclosed herein, which can be utilized as builders in commercial detergent compositions. Accordingly, it is an object of this invention to provide detergent compositions employing effective, non-phosphate builders as a replacement, in whole, or in part, for phosphate builders.

SUMMARY OF THE INVENTION

This invention provides detergent compositions comprising from about 0.5% to 65% by weight of a surfactant and from about 1 to 80% by weight of a builder, wherein the builder is a polymer selected from the group consisting of:

a) a polymer derived from a polymer of furan and maleic anhydride, comprising a repeating unit of the structure:

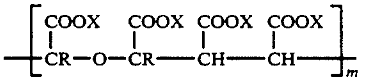

wherein R is H, $-CH_3$, $-CH_2CH_3$, or a combination thereof; X is H, or a salt forming cation, or a $C_1$–$C_{12}$ alkyl substituent, or a $C_5$–$C_{12}$ cycloalkyl substituent having at least one five- or six-membered ring, or a combination thereof; and m is at least 1;

b) a polymer derived from a polymer of furan, maleic anhydride and at least one copolymerized comonomer, comprising a repeating unit of the structure:

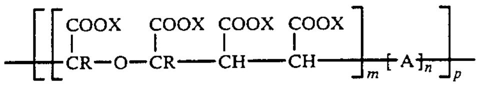

wherein A is a repeating unit derived from at least one copolymerized comonomer, selected from the group consisting of alkenyl alkyl ethers. alkyl acrylates, alkenyl carboxyalkyl ethers, vinyl esters of carboxylic acids, unsaturated carboxylic acids, unsaturated dicarboxylic acids and their anhydrides and esters, olefins and furan; R is H, $-CH_3$, $-CH_2CH_3$, or a combination thereof; X is H, or a salt forming cation, or a $C_1$–$C_{12}$ alkyl substituent, or a $C_5$–$C_{12}$ cycloalkyl substituent having at least one five-or six-membered ring, or a combination thereof; m is at least 1; n is greater than zero; and p is an integer from about 1 to 300;

c) a polymer of furan, maleic anhydride and at least one copolymerized comonomer, comprising a repeating unit of the structure:

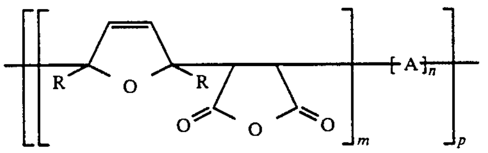

wherein A is a repeating unit derived from at least one copolymerized comonomer, selected from the group consisting of alkenyl alkyl ethers, alkyl acrylates, alkenyl carboxyalkyl ethers, vinyl esters of carboxylic acids, unsaturated carboxylic acids, unsaturated dicarboxylic acids other than maleic acid and their anhydrides and esters, and olefins; m is at least 1; n is greater than zero; and p is an integer from about 5 to 6,000; and d) combinations thereof.

Oxidized and unoxidized polymers of furan and maleic anhydride are employed as builders herein. In their oxidized form, the polymers are polyether polycarboxylate compositions comprising a repeating unit of Structure I:

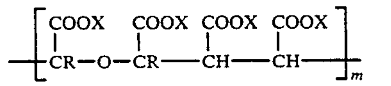

I

R, X and m are as defined above. Structure I is derived from one mole of furan and one mole of maleic anhydride. Typically, m is from about 1 to 300.

In their unoxidized form, the builder polymers comprise terpolymers of maleic anhydride, furan and at least one copolymerized comonomer selected from the group consisting of alkenyl alkyl ethers, alkyl acrylates, alkenyl carboxyalkyl ethers, vinyl esters of carboxylic acids, unsaturated carboxylic acids, unsaturated dicarboxylic acids and their anhydrides and esters, and olefins. The comonomer(s) may be present in any proportion provided that the unoxidized polymers function as effective detergent builders. The unoxidized polymers are intermediates in the preparation of the polyether polycarboxylate compositions by oxidation. The unoxidized polymers are exemplified by compositions wherein the comonomer is isobutyl vinyl ether, methyl acrylate, methyl vinyloxyacetate, acrylic acid, itaconic acid, or styrene.

These builder polymers may be utilized in the acid, salt (e g.. sodium, potassium, ammonium, monoethanolamine or triethanolamine), ester (e.g., alkyl or cycloalkyl) or anhydride form. The number average molecular weight of these polymers in the anhydride form is between 500 and 1,000,000. At lower levels of usage in detergent compositions (e.g., less than 1%), these polymers are also useful as anti-redeposition agents.

Detergent compositions of this invention comprise any of the compositions which are used for cleaning purposes, wherein the builder is selected from the builders disclosed herein. The detergent compositions may also contain one or more additional builders. Thus, the compositions include liquid and dry blends useful for household laundry detergents, automatic dishwashing machine detergents, hard surface cleaners, and industrial and specialty cleaning products. The oxidized polymer builders of this invention are particularly suited for use in liquid detergent compositions.

As used herein, "furan" refers to 2,5-dihydrofuran, 2-methylfuran, 2,5-dimethylfuran, 2-ethylfuran, 2,5-dimethylfuran, 2-ethyl-5-methylfuran, or a combination thereof.

DESCRIPTION OF THE DRAWINGS

(FIG. 1 is 0.2 g/l and FIG. 2 is 0.4 g/l). In these figures, the free calcium ion concentration remaining after treatment is plotted against the initial calcium ion load (60, 120, 180 or 240 ppm) added to solutions of the builders. Test methods and data used to generate these drawings are set forth in Example 4 and Table III, below.

DESCRIPTION OF THE PREFERRED EMBODIMENTS FURAN/MALEIC ANHYDRIDE POLYMERS

Figure 1:
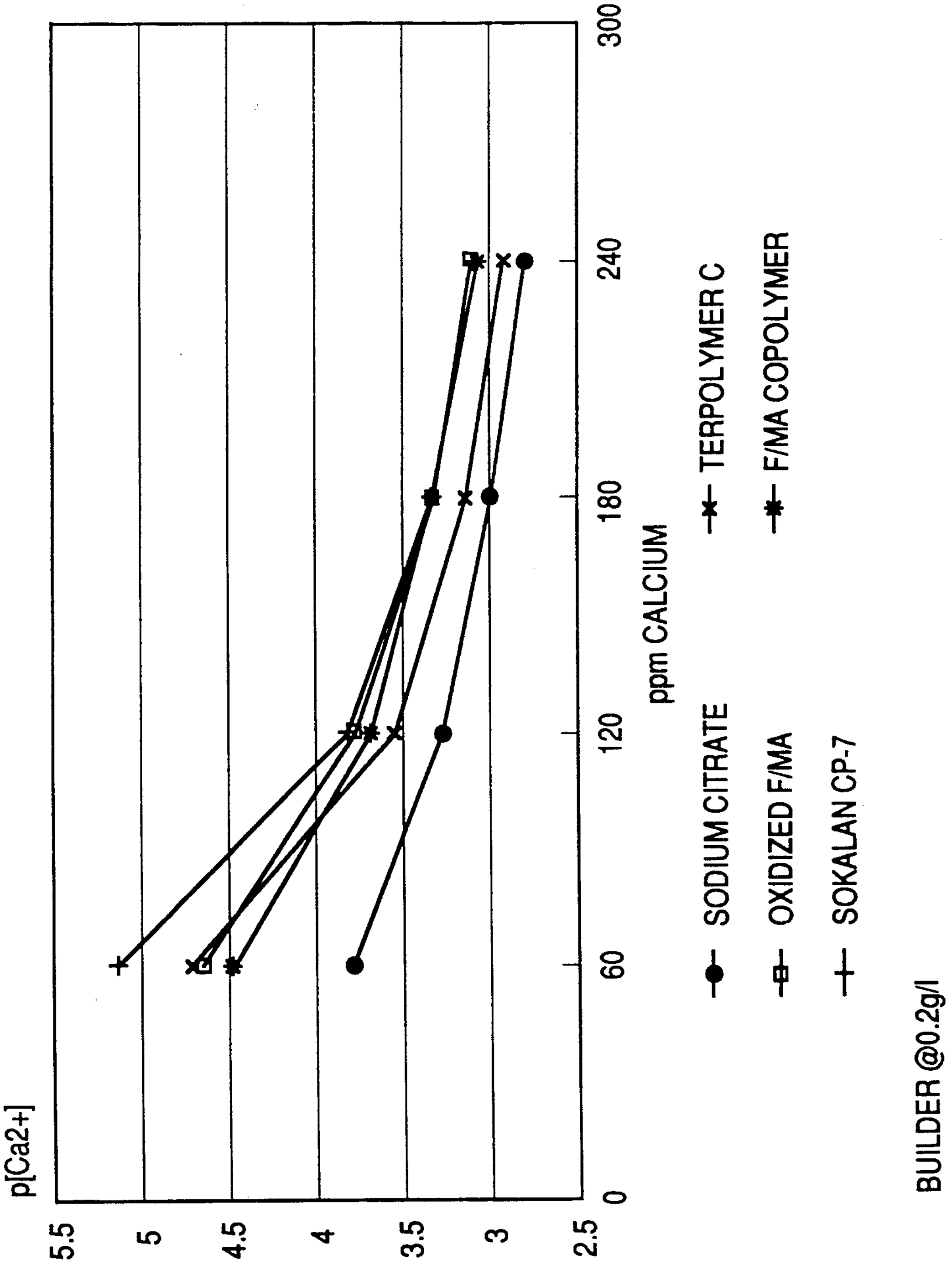
FIGS. 1 and 2 are two graphs illustrating calcium sequestration by detergent builders at two builder concentration levels

The F/MA copolymer is a substantially linear polymer, prepared by the method described in Gaylord, N. G., et al., *J. Macromol. Sci. - Chem.*, A6(1), 1459–1480 (1972). Alternatively, the F/MA copolymer may be prepared by any method known in the art for copolymerization of furan and at least one comonomer to yield a substantially linear copolymer. In preparing the copolymer, the furan and maleic anhydride monomers are converted to the 1:1 F/MA copolymer in high yield. When employed in its anhydride form, the F/MA copolymer comprises repeating units of structure II:

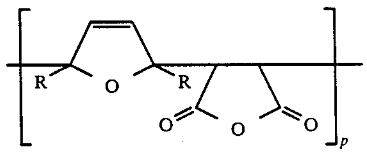

II

R is H, $-CH_3$, $-CH_2CH_3$ or a combination thereof; and p is from about 5 to 6,000. In the hydrolyzed (salt, acid or ester) form, the F/MA copolymer comprises a repeating unit of structure III:

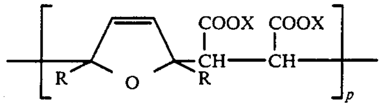

III

R is H, $-CH_3$, $-CH_2CH_3$ or a combination thereof; p is from about 5 to 6,000; and X is H, or a salt forming cation, or a $C_1$–$C_{12}$ alkyl substituent (ester), or a $C_5$–$C_{12}$ cycloalkyl substituent (ester) having at least one five- or six-membered ring, or a combination thereof. For the purposes of this invention, the salt, acid, ester, anhydride, or a combination thereof, may be employed.

The molecular weight corresponding to 5 to 6,000 repeating units of II ranges from about 800 to 1,000,000. The ranges of the molecular weight of the copolymer are limited only by the method of preparation, and effectiveness of the polymer as a builder. The corresponding number average molecular weight of the fully neutralized sodium salt of the copolymer ranges from about 1,100 to 1,500,000. In a preferred embodiment the sodium carboxylate salt of the polymer is prepared by dissolving the anhydride in water and neutralizing it with sodium hydroxide. The practitioner will recognize that if the anhydride form of the polymer is incorporated into a detergent formulation, hydrolysis to the carboxylic acid form will occur under the alkaline conditions which are typical of formulating, washing or cleaning conditions. The sodium, potassium, ammonium, monoethanolamine or triethanolamine carboxylate salts of the polymer are preferred. Although the polyvalent cations responsible for water hardness are generally not employed, any organic or inorganic base or salt forming cation may be utilized in preparing the salt of the polymer.

In a second preferred embodiment, a $C_1$–$C_{12}$ alkyl or a $C_5$–$C_{12}$ ester derivative of the moiety derived from the maleic anhydride (or acid) comonomer, is formed by reacting the polymer with an excess of $C_1$–$C_{12}$ alcohol. This reaction may be conducted in an aprotic solvent (e.g., toluene). Suitable alkyl esters may be prepared with any alkyl alcohol (e.g., lauryl alcohol); and suitable cycloalkyl esters may be prepared with any cycloalkyl alcohol (e.g., cyclohexanol).

The furan/maleic anhydride polymers containing other comonomers are prepared in the same manner as the F/MA copolymer, except that at least one copolymerizable comonomer, selected from the group consisting of alkenyl alkyl ethers, alkyl acrylates, alkenyl carboxyalkyl ethers, vinyl esters of carboxylic acids, unsaturated carboxylic acids, unsaturated dicarboxylic acids other than maleic acid and their anhydrides and esters, and olefins, is added to the reaction medium. Like the F/MA copolymer, the remaining furan/maleic anhydride/comonomer polymers are substantially linear polymers whose sodium salts have number average molecular weights in the range between 1,100 and 1,500,000.

The acid, salt, or ester form of the furan/maleic anhydride/comonomer polymers comprises repeat units of structure IV:

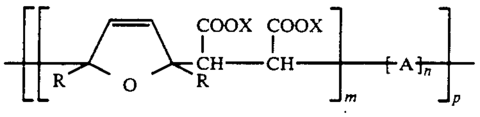

IV

R is H, $-CH_3$, $CH_2CH_3$, or a combination thereof; X is H, or a salt forming cation, or a $C_1$–$C_{12}$ alkyl substituent (ester), or a $C_5$–$C_{12}$ cycloalkyl substituent (ester) having at least one five- or six-membered ring, or a combination thereof., m is at least 1; n is greater than zero; and p is an integer from about 5 to 6,000. Structure A represents a repeating unit derived from at least one copolymerizable comonomer, selected from the group consisting of alkenyl alkyl ethers, alkyl acrylates, alkenyl carboxyalkyl ethers, vinyl esters of carboxylic acids, unsaturated carboxylic acids, unsaturated dicarboxylic acids other than maleic acid and their anhydrides and esters, and olefins. Structure A may consist of one or more of the selected comonomer(s). Certain of these comonomers (e.g., acrylic acid and maleic acid) are known to form homopolymers and copolymers which have commercial utility as detergent builders (e.g., acrylic acid/maleic acid copolymer and polyacrylic acid).

Structure A is an optional component of the oxidized polymer builders, but an essential precursor in the various novel unoxidized polymer intermediates of this invention. Thus, in these novel unoxidized polymer intermediates, m is at least 1, n must be greater than zero and p may range from about 5 to 6,000.

The practitioner will recognize that as the ratio of n to m increases, the preferred selection of comonomer(s) will shift toward those comonomers with known effectiveness as calcium or magnesium sequestrants or as detergent builders. Likewise, as the ratio of m to n increases, the builder effectiveness of the comonomer(s) becomes less critical and other factors, such as cost and detergent formulation compatibility will guide comonomer(s) selection.

OXIDATION OF FURAN/MALEIC ANHYDRIDE POLYMERS

The polyether polycarboxylate compositions herein are prepared by the oxidation of the above-described F/MA copolymers and furan/maleic anhydride/comonomer polymers, as depicted schematically below:

II

I

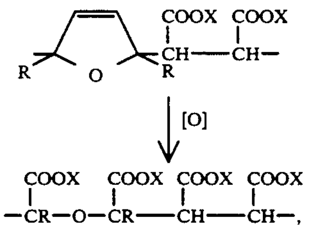

and

IV

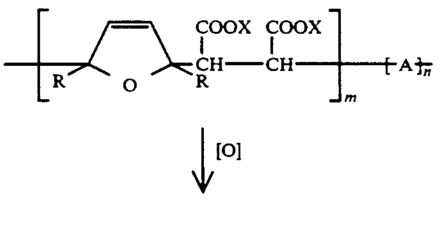

-continued

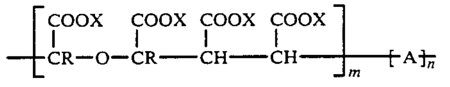

V

R, X, m, n and A are as previously defined. The oxidized polymer must contain at least one unit of the oxidized structures which are depicted above. The polymers may be fully or partially oxidized and mixtures of the two maybe used herein. The oxidation product typically contains a mixture of partially oxidized polymers of various molecular weights. The molecular weight distribution will depend upon the method of oxidation and the amount of polymer degradation occurring during oxidation. Any method of oxidation may be employed, provided that degradation of the polymer is controlled such that the oxidized polymer has a molecular weight profile within a range suitable for the oxidized polymer's intended use(s).

Reagents useful in the oxidation process include ozone/hydrogen peroxide mixtures, potassium permanganate, sodium tungstate/hydrogen peroxide mixtures, and nitric acid (e.g., 44%). Any other reagent which will oxidatively cleave the carbon-carbon double bond contained in the 2,5-dihydrofuran residue of the polymers to yield carboxylic acid groups also may be employed herein. In a preferred embodiment nitric acid is employed as the oxidant. About 3.0 to 6.0 moles of nitric acid are provided for each mole of 2,5.dihydrofuran residue in the reaction medium at 60°-90° C. In another preferred embodiment, ozone/hydrogen peroxide is employed as the oxidant. Both of these reagents produce a high degree of oxidation with moderate levels of polymer degradation.

Oxidation employing ozone/hydrogen peroxide may be carried out at a pH from 7 to 12, preferably 8 to 10, with the polymer in a solvent such as water, acetone, or methanol at a temperature from 0° to 85° C., preferably 0° 15° C. In a preferred embodiment, from about 1.5 to 4.0 moles of $O_3$ are provided for each mole of 2,5-dihydrofuran residue in the reaction medium. Oxidation is continued until the desired acid number is achieved. Similar conditions for each type of oxidizing reagent are disclosed herein and other suitable conditions will be readily apparent to the practitioner.

The amount of polymer oxidation may be calculated from the carboxylic acid numbers (determined by titration with NaOH) of the oxidized and unoxidized polymers. The amount of oxidant is expressed herein as $O_3$/double bond equivalent ($O_3$/DBE) which represents the moles of $O_3$ per mole of 2,5-dihydrofuran residue in the polymer. The amount of oxidation may also be measured by C-13 NMR analysis or by any method known in the art.

In a preferred embodiment, a novel polymer is prepared by oxidation of a terpolymer containing a molar ratio of 2:1:1 of maleic anhydride, furan and isobutyl vinyl ether, exemplifying the class of alkenyl alkyl ether monomers. In a second preferred embodiment, a novel polymer is prepared by oxidation of a terpolymer containing a molar ratio of 2:1:1 of maleic anhydride, furan and methyl acrylate, exemplifying the class of alkyl acrylate monomers. In a third preferred embodiment, a novel polymer is prepared by oxidation of a terpolymer containing a molar ratio of 2:1:1 of maleic anhydride, furan and acrylic acid, exemplifying the class of unsaturated carboxylic acids. In a fourth preferred embodiment, a novel polymer is prepared by oxidation of a terpolymer containing a molar ratio of 2:1:1 of maleic anhydride, furan and methyl vinyloxyacetate, exemplifying the class of alkenyl carboxyalkyl ethers. (The methyl vinyloxyacetate residue may be hydrolyzed after polymerization to yield pendant carboxylic acid groups.) In a fifth preferred embodiment, a novel polymer is prepared by oxidation of a terpolymer containing a molar ratio of 2:1:1 of maleic anhydride, furan and itaconic acid, exemplifying the class of unsaturated dicarboxylic acids other than maleic acid and their anhydrides and esters. In a sixth preferred embodiment, a novel polymer is prepared by oxidation of a terpolymer containing a molar ratio of 2:1:1 of maleic anhydride, furan and styrene, exemplifying the class of olefins. In a seventh preferred embodiment, a novel polymer is prepared by oxidation of a terpolymer containing a molar ratio of 2:1:1 of maleic anhydride, furan and vinyl acetate, exemplifying the class of vinyl esters of carboxylic acids.

It will be recognized by the practitioner that although substantially linear copolymers of furan and maleic anhydride will not vary from the 1:1 molar ratio, the other polymers of this invention are not so limited. Thus, although both furan and maleic anhydride must be present along with at least one comonomer to form the other novel polymers, the molar ratio of furan, maleic anhydride and the comonomer(s) may vary.

Similarly, the practitioner will recognize that although certain comonomers are selected for the preferred embodiments disclosed herein, any monomers within the selected class may be utilized. Furthermore, small quantities of polyfunctional comonomers which are not within the selected classes may be utilized, provided that the resulting oxidized polymers retain their effectiveness as detergent builders. Examples of such polyfunctional comonomers are acrylates and methacrylates of polyols, allyl and vinyl esters of polycarboxylic acids, divinyl benzene, and the like.

The alkenyl alkyl ether monomers useful herein include vinyl methyl ether, vinyl ethyl ether, vinyl n-propyl ether, vinyl i-propyl ether, vinyl n-butyl ether, vinyl sec-butyl ether, vinyl t-butyl ether, vinyl pentyl ether, higher vinyl alkyl ethers, and the like.

The alkyl acrylate monomers useful herein include methyl acrylate, ethyl acrylate, propyl acrylate, butyl acrylate, pentyl acrylate, and higher acrylates and corresponding 2-substituted acrylates where the 2-substitution is $C_1$-$C_6$ alkyl and cycloalkyl, and the like.

The alkenyl carboxyalkyl ethers useful herein include methyl vinyloxyacetate, methyl vinyloxypropionate, methyl vinyloxybutanoate, methyl vinyloxypentanoate, vinyl 3,3-dicarboxymethylpropyl ether, vinyl 3,3,3-tricarboxymethylpropyl ether, and the like.

The polymerizable unsaturated carboxylic and dicarboxylic acid (and ester and anhydride) monomers useful herein include acrylic acid, methacrylic acid, maleic acid, itaconic acid, crotonic acid, and the like. The oxidized terpolymer may contain maleic acid (or its anhydride or ester) as the third comonomer, but the novel, unoxidized terpolymers herein must contain a third monomer in addition to maleic acid and furan.

The olefins useful herein include ethylene, propylene, 1-butene, 1-pentene, higher olefins, and substituted olefins such as styrene and the like.

The vinyl esters useful herein include vinyl formate, vinyl acetate, vinyl propionate, vinyl butanoate, vinyl pentanoate, vinyl neodecanoate, and the like.

Other substantially linear polymers, containing one, two or more comonomer(s) in addition to the furan and maleic anhydride comonomers, are intended to fall within the scope of this invention, provided that they do not render the oxidized polymer ineffective as a detergent builder.

Additionally, although only one method of preparation of these polymers was employed in the preferred embodiments disclosed herein, it is intended that the polymers of this invention may be prepared by any method known in the art. The only limitations are that the polymer be prepared as a substantially linear copolymerized product containing the furan monomer, which upon hydrolysis of the anhydride rings of the polymer, forms dicarboxylic acid groups that are available for complexing metallic ions. Acceptable methods of preparation are known in the art and include Gaylord, N. G., et al., *J. Macromol. Sci., Chem.*, A6(1), 1459–1480 (1972); Butler, G. et al., *J. Macromol., Sci., Chem.*, A4(1) 51–63 (1970); and Gaylord, N. G., et al., *J. Polymer Sci.: Polymer Chem. Ed.*, 16 : 1527–37 (1978).

DETERGENT COMPOSITIONS

The detergent formulations comprise from about 0.5 to 65% by weight of a surfactant, or a blend of surfactants, and 1 to 80% by weight of one of the builder polymers disclosed herein, or a blend of builders containing at least one of the furan/maleic anhydride polymer builders. In a preferred embodiment, from about 0.5 to 30% by weight of a surfactant, or a blend of surfactants, and from about 2 to 65% by weight of a furan/maleic anhydride polymer builder, or a blend of builders containing at least one furan/maleic anhydride polymer, are employed.

If a blend of builders is employed, the polymers disclosed herein may be present at lower percentages, provided that the total amount of builder is at least 1% of the detergent formulation. When used in conjunction with one or more co-builders, these polymers may function primarily as anti-redeposition or anti-incrustation agents (i.e., when the polymers are less than 1% of the formulation).

Optional components of the detergent formulations include, but are not limited to, ion exchangers, alkalies, anticorrosion materials, anti-redeposition materials, optical brighteners, fragrances, dyes, fillers, chelating agents, enzymes, e.g., lipase(s), fabric whiteners and brighteners, sudsing control agents, solvents, hydrotropes, bleaching agents, bleach precursors, buffering agents, soil removal agents, soil release agents, fabric softening agent and opacifiers.

These optional components may comprise up to about 90% of the detergent formulation. Examples of these optional components, commonly used surfactants and various builders are set forth in detail in U.S. Pat. No. 4,663,071 to Bush, issued May 5, 1987 which is hereby incorporated by reference.

In a preferred embodiment, an oxidized F/MA copolymer builder is incorporated into a liquid household laundry detergent formulation, comprising 5–50% surfactant(s), 1–55% builder(s), and 15–95% of a combination of optional ingredients, such as buffers, enzymes, softeners, antistatic agents, fluorescers, perfumes, water and fillers.

In a second preferred embodiment, any of the builder polymers disclosed herein are incorporated into a powdered household laundry detergent formulation, comprising 10–25% surfactant(s), 2–63% builder(s), and 12–88% optional components, such as buffers, enzymes, softeners, antistatic agents, bleaches, optical brightners, perfumes, and fillers.

Also useful herein are any detergent formulations, used commercially or experimentally, which employ a phosphate co-builder or phosphate-replacer builder or co-builder, or any builder which functions chiefly to sequester calcium, magnesium and other polyvalent cations present in hard water. Formulations employing mixtures of builders, including phosphate-containing mixtures, are also useful.

In a third preferred embodiment, any of the builder polymers disclosed herein are incorporated into a detergent formulation for use in automatic dishwashing machines, comprising from about 2–6% relatively low sudsing nonionic surfactant(s) (e.g., alkoxylation products of compounds containing at least one reactive hydrogen, such as BASF-Wyandotte Corporation's Pluronic ®, Tetronic ® and Pluradot ®), 1–65% builder(s), and 29–96% optional components, such as suds control agents (e.g., mono- and distearyl acid phosphates), fragrances, and fillers.

The detergent compositions of this invention may take any of the physical forms associated with detergent compositions, such as powders, granules, cakes and liquids. They may also be produced by any of the techniques commonly employed in the manufacture of detergent compositions. including slurry-making and spray-drying processes for the manufacture of detergent powders. The builder may be incorporated in the slurry or blended with spray-dried base powder. The practitioner will recognize which formulations are best suited to the physical form selected for a particular detergent composition and adjust the formulation accordingly.

This invention is illustrated by the following examples.

EXAMPLE 1

This example illustrates the preparation of the furan/maleic anhydride terpolymers and copolymer.

A. Preparation of F/MA terpolymer

A 500 ml, 4-necked flask was equipped with a mechanical stirrer, condensor, nitrogen inlet, addition funnel and thermometer. Maleic anhydride (14.4 g, 147 m mol) was dissolved in 55 ml of 50/50 (v/v) p-dioxane/methyl ethyl ketone and charged to the flask. Furan (5 0 g. 73.5 m mol), the third monomer (73.5 m mol, see Table I) and t-amylperoxypivalate (0.48 g, 2.6 m mol) were dissolved in 45 ml of 50/50 (v/v) p-dioxane/methyl ethyl ketone and charged to the addition funnel. The flask was flushed with nitrogen, heated to 78° C. in a water bath and maintained under a nitrogen atmosphere while the furan/third monomer solution was slowly added with stirring over a period of 12 minutes. The reaction was permitted to continue for 2 hours at 80° C., and then the reaction mixture was cooled to room temperature. The reaction product was precipitated by adding the mixture to 500 ml of toluene with stirring. The product was washed twice with toluene (2×100 ml) and dried in a vacuum oven overnight at 50° C. Molecular weights were measured by gel permeation chromatography against dextran standards in dimethyl sulfoxide (DMSO).

The third monomers employed herein are listed in Table I Characteristics of the terpolymers prepared from these monomers are also listed in Table I.

B. Preparation of furan/maleic anhydride copolymers

The copolymer was prepared by the same method as the terpolymer except that 7.2 g (73.5 m mol) of maleic anhydride and 5 g (73.5 m mol) of furan (1:1 molar ratio) were employed.

The yield was 83% (10 g) of dried powder and an additional 5% (0.6 g) of solid residue after removing the solvent from the filtrate, for a total yield of 88%. The molecular weight of the copolymer is listed in Table I.

TABLE I

Furan/Maleic Anhydride Polymers

| Mole Ratio MA:F:M[a] | Optional Monomer | g of Optional Monomer | Molecular Weight: Weight Average | Molecular Weight: Number Average | Solubility in Water[b] |
|---|---|---|---|---|---|
| 1:1:0 | — | — | 7,050 | 2,570 | soluble |
| 2:1:1 | A. Acrylic acid | 18.0 | 9,900 | 2,200 | soluble |
| 2:1:1 | B. vinyl acetate | 21.5 | 11,700 | 3,670 | soluble |
| 2:1:1 | C. isobutyl vinyl ether | 25.0 | 7,100 | 2,670 | soluble |
| 2:1:1 | D. methyl acrylate | 21.5 | 12,170 | 3,875 | soluble |
| 2:1:1 | E. methyl vinyloxy acetate | 29.0 | 5,000 | 2,000 | soluble |

[a]M represents the optional monomer.
[b]At an alkaline pH (maintained with 0.1 N NaOH)

EXAMPLE 2

This example illustrates the preparation of high molecular weight furan/maleic anhydride copolymers.

Furan was copolymerized with maleic anhydride by the method disclosed in Butler, G. B. et al., *J. Macromol. Sci.-Chem.*, A4(1) 51-63 (1970), at page 52-53, except that the polymerization was carried out in toluene with 2 mole percent benzoyl peroxide as the initiator. The crude product contained 1.2% residual maleic anhydride.

A sodium carboxylate copolymer was obtained upon suspension of the anhydride copolymer in water, followed by neutralization with sodium hydroxide. After neutralization, the very high molecular weight copolymer which had been prepared with a benzoyl peroxide catalyst formed a light yellow gel.

The molecular weight of the copolymer could not be measured by gel permeation chromatography because it was insoluble. The insolubility of the copolymer, together with the ability of the copolymer to gel indicated that the copolymer was lightly crosslinked. The weight average molecular weight of the anhydride form of the furan/maleic anhydride copolymer was estimated to be in excess of 1,000,000.

EXAMPLE 3

This example illustrates the preparation of polyether polycarboxylates by the oxidation of a F/MA copolymer.

The F/MA copolymer was oxidized employing the reagents and conditions set forth in Table II, below.

TABLE II

Oxidation of F/MA Copolymers

| Oxidation Method[c] | Solvent | °C. Temp. | pH | $O_3$/DBE[a] | Mw[d] | Mn[e] | % Oxidation |
|---|---|---|---|---|---|---|---|
| Control (F/MA copolymer) | — | — | — | — | 10,000 | 4,000 | 0 |
| Ozone/Hydrogen Peroxide | Water | 0-5 | 2 | 1.0 | 1,900 | 1,000 | 30 |
| Ozone/Hydrogen Peroxide | Water | 0-5 | 2 | 5.6 | 650 | 300 | 95 |
| Ozone/Hydrogen Peroxide | Water | 0-5 | 9 | 1.7 | 2,500 | 900 | 50 |
| Ozone/Hydrogen Peroxide | Water | 0-5 | 9 | 1.0 | 6,300 | 2,300 | 30 |
| Ozone/Hydrogen Peroxide | Methanol | 70 | — | 1.4 | 1,600 | 730 | 60 |
| Potassium Permanganate | Water | 0-10 | 9 | — | 1,300 | 740 | 45 |
| Potassium Permanganate | Acetone | 5 | — | — | 2,400 | 1,300 | 60 |
| Sodium Tungstate/ Hydrogen Peroxide | Water | 80 | 9 | — | 840 | 500 | 37 |
| 44% Nitric Acid | Water | 50 | — | — | 1,600 | 995 | 95 |

[a]$O_3$/DBE represents the moles of $O_3$ per mole of unsaturated furan residue.
[b]% Oxidation was determined by C-13 NMR.
[c]See Example 3, parts A-D.
[d]Weight average molecular weight (Mw) was determined by gel permeation chromatography.
[e]Number average molecular weight (Mn) was determined by gel permeation chromatography.

A. Oxidization by Ozone/Hydrogen Peroxide

1. Acidic Conditions

A 25 g sample of the copolymer in the anhydride form was dissolved in 200 ml of distilled water (pH 1.8 to 2.5) by heating the polymer suspension to 50° C.

The solution was cooled to 5° C. and a mixture of $O_3/O_2$ was passed from an ozone generator. The extent of oxidation was controlled by controlling the amount of ozone which was allowed to contact the solution. Typically, an amount of $O_3$ sufficient to provide 2 mole equivalents of $O_3$ per mole of double bond was necessary to achieve high levels of oxidation.

After ozonolysis, 1.5 mole equivalent of $H_2O_2$ per mole of double bond was added and the solution heated to 60° C. for 3 hours. Sufficient NaOH was added to bring the pH to 7 to 8 and then the solution was concentrated to 40% solids. The solid polymer was isolated as a sodium salt by precipitation into methanol.

When the acid form of the oxidized polymer is desired, the carboxylate salt is converted to the acid by treating the polymer salt solution with a strong acid cation exchange resin.

2. Alkaline Conditions

Oxidation was carried out in the same manner as under acidic conditions except that the pH of the polymer solution was adjusted to 8.5 to 12.0 by the addition of sodium hydroxide.

B. Oxidation by Potassium Permanganate

Solution of the copolymer in water was prepared as described under part "A. 1." above (ozone oxidation in acidic medium).

The solution was cooled to 5° C. and a solution of 8 g of $KMnO_4$ in 750 ml of water was slowly added, with stirring, while maintaining the reaction temperature at or below 5° C. After addition was complete, the reaction mixture was heated to 60° C. for 2 hrs. (a brown precipitate was formed). Sulfur dioxide gas was bubbled through the reaction mixture to reduce any unreacted manganate to $MnO_2$. The precipitated $MnO_2$ was filtered, and the clear light brown filtrate was treated with 500 ml of strong acid ion exchange resin to remove metal ions. The aqueous solution of the oxidized polymer was concentrated under vacuum to obtain 18 g of light brown powder.

C. Oxidation by Sodium Tungstate/Hydrogen Peroxide

This oxidation was carried out by the method described in EP 201,719A, except that sufficient 6M sulfuric acid was added to maintain a pH of 3 during the course of the reaction. After the reaction was complete, sufficent NaOH was added to obtain a pH of 8.0 and the oxidized polymer salt was isolated as a precipitate from methanol.

D. Oxidation by Nitric Acid

The oxidation using nitric acid was carried out by the method described in U.S. Pat. No. 3,534,067, except that after the oxidation the polymer solution was neutralized with sufficient NaOH to adjust the pH to 8.0 and the precipitated sodium nitrate was filtered off. The filtrate was concentrated to give a 40% solution of the polymer from which the solid polymer salt was precipitated into methanol.

As the results in Table II illustrate, the potassium permanganate and sodium tungstate oxidation methods created more polymer degradation and less polymer oxidation than the ozonolysis or nitric acid oxidation methods. Ozonolysis in alkaline medium minimized degradation but required greater than stoichiometric amounts of ozone to produce a high degree of oxidation.

EXAMPLE 4

This example illustrates the capacity of the F/MA polymers and their oxidized counterparts for calcium sequestration.

Aliquots of solutions containing 0.1, 0.2, 0.3 or 0.4 g/l of the experimental and control polymers were each treated with solutions of calcium chloride in water, containing, respectively, 60, 120, 180 and 240 ppm $Ca^{++}$ ion. A calcium ion selective electrode (Corning Radiometer F2110 Calcium Selective Electrode) was used to measure the free $Ca^{++}$ ion concentration of the treated solutions.

The detergent builders tested for calcium ion sequestration included the F/MA copolymer, terpolymers A-E of Example 1, sodium citrate (a builder commercially used in liquid detergents), and Sokalan ® CP-7 (a trademark registered to BASF Corporation and used in connection with a copolymer of acrylic acid and maleic acid and a detergent builder which is commercially used in powdered detergents).

Figure 2:
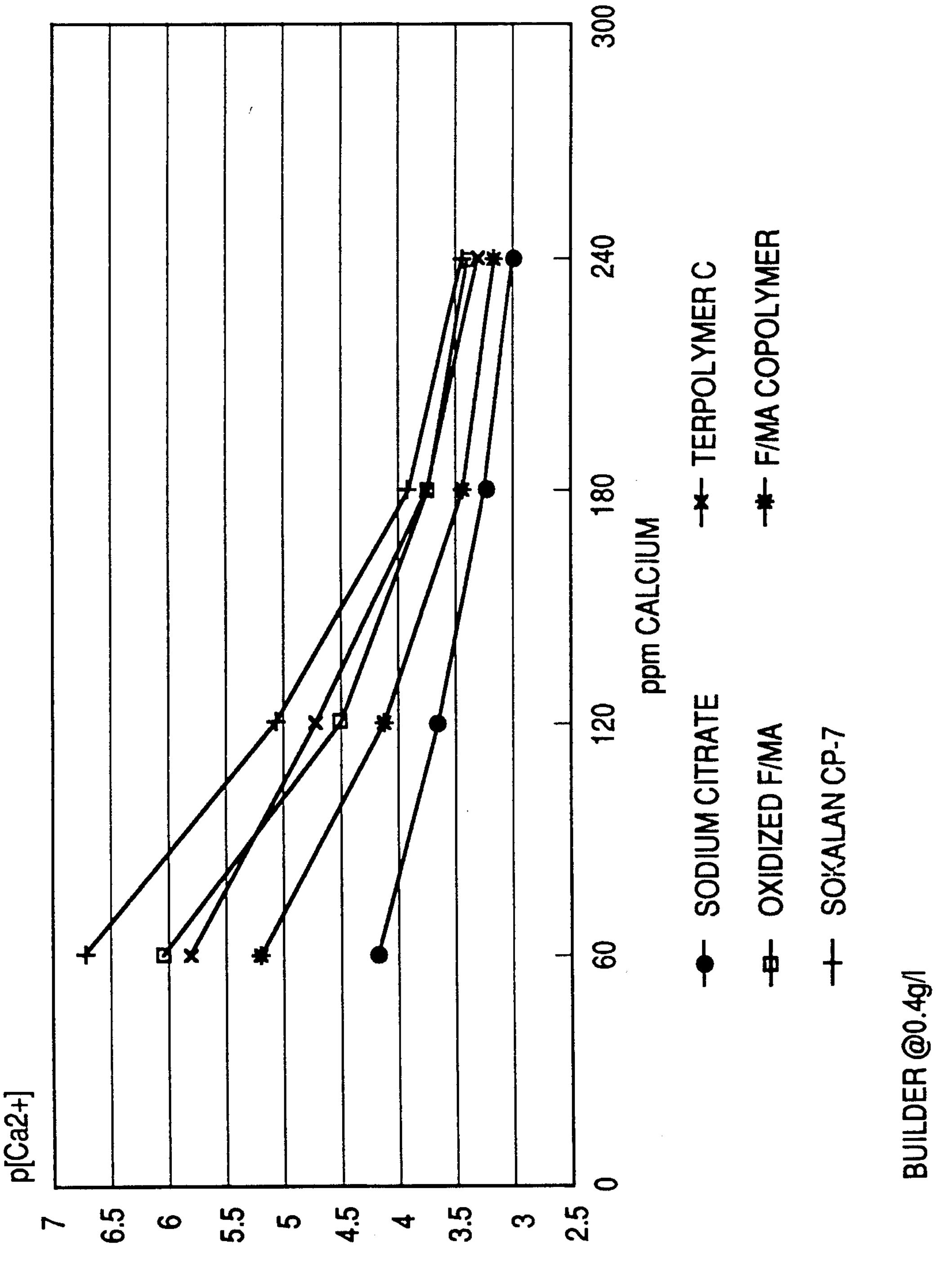

Results expressed as p ($Ca^{++}$) are set forth in Table III. Results are also illustrated in FIGS. 1 and 2. All treatments resulted in higher p ($Ca^{++}$) (indicating lower concentration of free $Ca^{++}$ ion remained in solution following treatment) as the treatment level was increased. Overall, the F/MA copolymer and terpolymers A.E sequestered calcium ions as effectively as the commercially used detergent builder. The Sokolan ® CP-7 builder was more effective at lower calcium ion concentrations and at the higher polymer concentrations which were tested. All experimental F/MA polymer builders were more effective than sodium citrate under all test conditions. The oxidized and unoxidized F/MA copolymers were slightly more effective than the terpolymers.

TABLE III

Calcium Sequestration at 60 ppm, 120 ppm, 180 ppm and 240 ppm $Ca^{++}$

| | | p ($Ca^{++}$) Treatment Level (g/l) | | | |
|---|---|---|---|---|---|
| Builder[b] | ppm $Ca^{++}$ | 0.1 | 0.2 | 0.3 | 0.4 |
| Sokalan ® | 60 | 4.19 | 5.14 | 6.41 | 6.68 |
| CP-7 | 120 | 3.46 | 3.82 | 4.52 | 5.04 |
| | 180 | 3.14 | 3.33 | 3.66 | 3.93 |
| Sodium | 60 | 3.54 | 3.79 | 3.98 | 4.13 |
| Citrate | 120 | 3.10 | 3.28 | 3.45 | 3.61 |
| | 180 | 2.88 | 2.99 | 3.11 | 3.25 |
| | 240 | 2.72 | 2.80 | 2.90 | 3.00 |
| F/MA | 60 | 4.02 | 4.49 | 4.88 | 5.17 |
| Copolymer | 120 | 3.37 | 3.70 | 3.68 | 4.06 |
| | 180 | 3.03 | 3.32 | 3.25 | 3.45 |
| | 240 | 2.84 | 3.07 | 3.01 | 3.13 |
| Oxidized[a] | 60 | 4.04 | 4.65 | 5.46 | 6.02 |
| F/MA | 120 | 3.46 | 3.70 | 4.05 | 4.48 |
| Copolymer | 180 | 3.06 | 3.32 | 3.52 | 3.73 |
| | 240 | 2.97 | 3.10 | 3.22 | 3.35 |
| Terpolymer | 60 | 3.81 | 4.58 | 5.25 | 5.92 |
| A (Acrylic | 120 | 3.21 | 3.48 | 4.01 | 4.78 |
| Acid) | 180 | 2.96 | 3.11 | 3.34 | 3.84 |
| | 240 | 2.79 | 2.90 | 3.04 | 3.39 |
| Terpolymer | 60 | 3.62 | 4.07 | 4.62 | 4.99 |
| B (Vinyl | 120 | 3.14 | 3.33 | 3.60 | 3.95 |
| Acetate) | 180 | 2.90 | 3.01 | 3.17 | 3.36 |
| | 240 | 2.73 | 2.82 | 2.93 | 3.06 |
| Terpolymer | 60 | 3.80 | 4.71 | 5.46 | 5.77 |
| C (Isobutyl | 120 | 3.21 | 3.55 | 4.10 | 4.66 |
| vinyl ether) | 180 | 2.95 | 3.14 | 3.39 | 3.73 |
| | 240 | 2.78 | 2.91 | 3.06 | 3.25 |
| Terpolymer | 60 | 3.61 | 4.07 | 4.59 | 4.99 |
| B (Methyl | 120 | 3.14 | 3.34 | 3.57 | 3.88 |
| Acrylate) | 180 | 2.91 | 3.03 | 3.15 | 3.32 |
| | 240 | 2.75 | 2.84 | 2.91 | 3.02 |
| Terpolymer | 60 | 3.78 | 4.62 | 5.23 | 5.66 |
| E (methyl | 120 | 3.17 | 3.47 | 4.03 | 4.63 |
| vinyl oxy- | 180 | 2.91 | 3.05 | 3.31 | 3.74 |
| acetate)[c] | 240 | 2.73 | 2.82 | 2.97 | 2.99 |

[a]Oxidized with ozone/hydrogen peroxide at pH of 9.0.
[b]Terpolymers were in sodium salt form.
[c]Methyl ester of the vinyl oxyacetate was hydrolyzed during preparation of the sodium salt.

Figure 3:
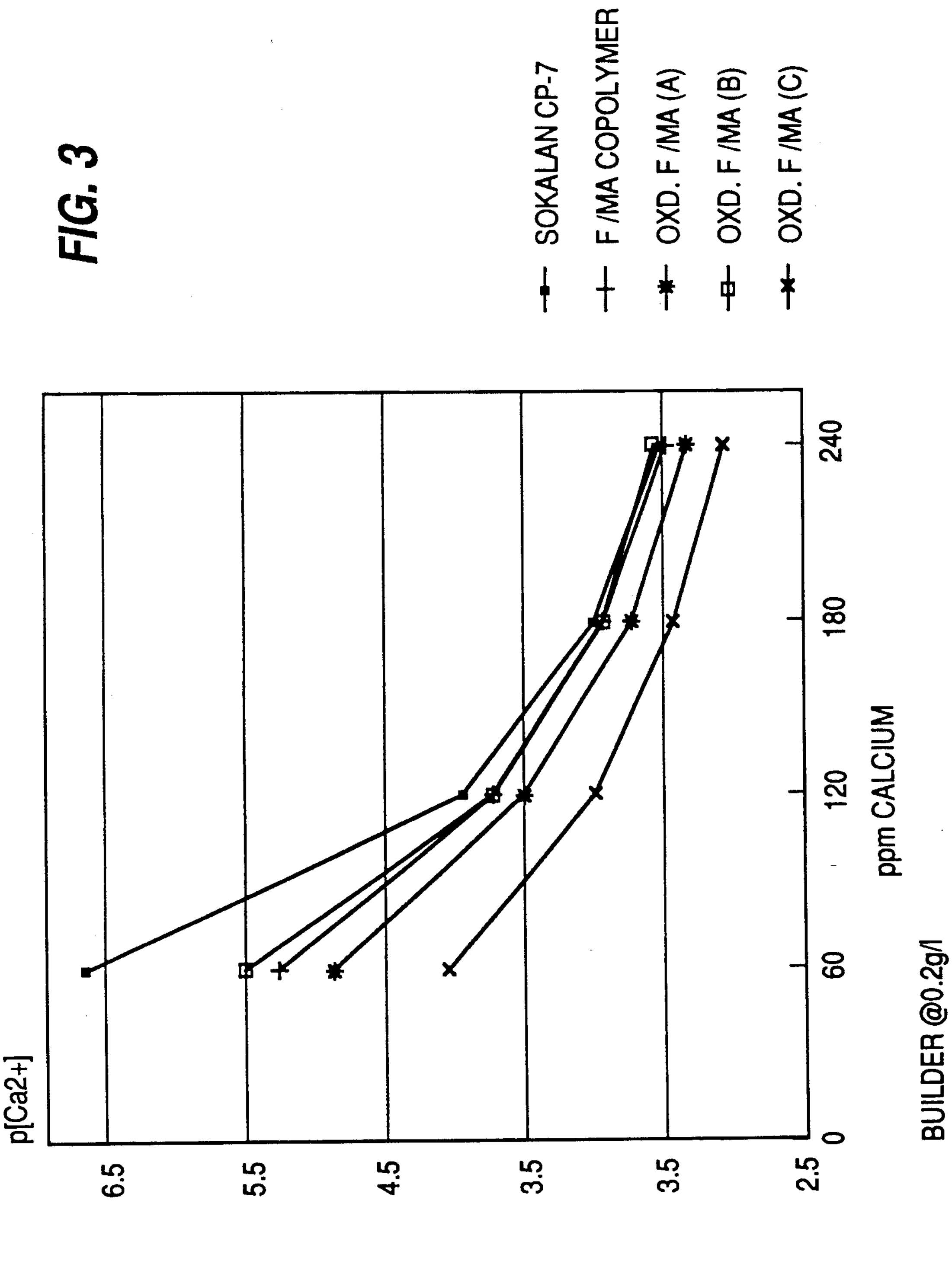
FIG. 3 is a graph illustrating calcium sequestration by oxidized F/MA polymers prepared by different methods of oxidation. Test methods and oxidation methods are described in Example 4, Example 3 and Table IV, below.

The $Ca^{++}$ ion sequestration capacity of the oxidized polymers listed in Table IV, below, was also measured. Results at 0.2 g/l polymer concentration are shown in FIG. 3 which graphically illustrates the relative $Ca^{++}$ sequestration capacity of each builder over a range of calcium ion concentrations.

TABLE IV

| Characteristics of Oxidized F/MA Copolymers and Terpolymers[f] | | | | |
|---|---|---|---|---|
| Polymer | Oxidation[c] Method | % Oxidation | Mw[d] | Mn[e] |
| Sokalan ®[h] CP-7[a] | Control | — | — | — |
| Hydrolyzed[gh] F/MA | Control | — | 10,000 | 4,000 |
| F/MA (Sample A)[h] | $O_3$, pH 12 | 75 | 3,400 | 1,600 |
| High Molecular Weight F/MA (Sample B)[h] | $O_3$, pH 9 | 58 | 12,300 | 2,400 |
| F/MA (Sample C)[h] | $HNO_3$ | >95 | 1,630 | 1,000 |
| F/MA Terpolymer A (acrylic acid) (Sample D) | $HNO_3$ | >95 | 1,400 | 1,000 |
| F/MA (Sample E) | $O_3$ in $H_2O$/$CH_3OH$ | 67 | 4,800 | 430 |

[a]Control (commercial detergent builder). See Example 4.
[b]Copolymer prepared by the method of Example 2.
[c]See Example 3.
[d]Average molecular weight (Mw) by gel permeation chromatography.
[e]Number average molecular weight (Mn) by gel permeation chromatography.
[f]Relative amount of $Ca^{++}$ sequestration is illustrated in FIG. 3 herein.
[g]The anhydride was hydrolyzed to its corresponding carboxyloic acid by heating a suspension of the polymer in water to 70° C.
[h]See FIG. 3 for a comparison of controls and Samples A-C.

These results show that alkaline ozonolysis of the high molecular weight F/MA copolymer of Example 2 produced relative $Ca^{++}$ sequestration capacity equivalent to that of the control (Sokalan CP-7), while maintaining a molecular weight of 12,300.

A comparison of the relative $Ca^{++}$ sequestration capacity of the equivalent molecular weight copolymers in FIG. 3, with and without oxidation, shows that the oxidized polymer was significantly more effective than the unoxidized polymer.

EXAMPLE 5

This example illustrates the preparation and detergency of household laundry detergent compositions employing the builders disclosed herein.

The characteristics of the unoxidized F/MA polymers employed in this Example are listed in Table V, below.

TABLE V

| Characteristics of F/MA Polymers[a] | | | |
|---|---|---|---|
| Molar Ratio[b] | Mw[c] | Mn[d] | Wt.[e] Conversion to $Na^+$ Salt |
| Copolymer F/MA (1:1) | 9900 | 4060 | 1.373 |
| A F/AA/MA (1:1:2) | 9900 | 2200 | 1.437 |
| B F/VAc/MA (1:1:2) | 11700 | 3670 | 1.354 |
| C F/i-BVE/MA (1:1:2) | 7100 | 2670 | 1.35 |
| D F/MAc/MA (1:1:2) | 12170 | 3875 | 1.354 |

[a]Unoxidized F/MA polymers used in Example 5 detergency tests.
[b]AA = Acrylic acid
MAc = Methyl acrylate
F = Furan
MA = Maleic anhydride
i-BVE = Isobutyl vinyl ether
VAc = Vinyl Acetate
[c]Average molecular weight of F/MA polymer.
[d]Number average molecular weight of F/MA polymer.
[e]Weight of sodium carboxylate polymer = weight conversion factor X weight of anhydride.

Detergent composition suitable for use as powdered household laundry detergent were prepared according to the following single active anionic formulations:

| Anionic Surfactant Formulations | | | | | | |
|---|---|---|---|---|---|---|
| | Formula No: | | | | | |
| | 1 | 2 | 3 | 4 | 5 | 6 |
| Component | % by Weight in Formulation | | | | | |
| Sodium Alkylbenzene Sulfonate(C13) | 15 | 15 | 15 | 15 | 15 | — |
| Alcohol Ethoxylate | — | — | — | — | — | 10 |
| Sodium Carbonate | 18 | 18 | 18 | 18 | 18 | 18 |
| Sodium Silicate | 20 | 20 | 20 | 20 | 20 | 20 |
| Sodium Sulfate | 47 | 27 | 27 | 27 | 27 | 27 |
| Sodium Tripoly phosphate | — | 25 | — | — | — | — |
| Sokolan CP-7 | — | — | 25 | — | — | — |
| [a] F/MA Copolymer | — | — | — | 25 | — | — |
| [a] F/MA Terpolymer A (Acrylic Acid) | — | — | — | — | 25 | 25 |

[a] Weight percentage of sodium salt of polymer.
[b] Alfonic ® 1412-70 (12-14C alcohol ethoxylate containing 70% ethylene oxide by weight).

Detergency evaluations were conducted in a Terg-o-tometer (U.S. Testing Company) employing detergency monitor cloths which are similar to the widely used detergency monitor cloths sold by Test Fabrics Company. Clay/Particulate type; Fatty/Particulate type; (Vacuum Cleaner Dust); and Fatty/Oily type cloths were used. Water hardness was adjusted to 60, 120 or 180 ppm polyvalent cations (calculated as calcium carbonate; 2:1 ratio of $Ca^{++}$: $Mg^{++}$). Water at the appropriate hardness was first added to the Terg-o-tometer beaker. The appropriate amounts of the detergent formulations were then added to make one liter of detergent solution having a total concentration of 1.5 gm/liter. The oxidized F/MA polymers were preneutralized with NaOH. After the test solution reached the desired wash temperature (40° C.), the detergency monitor cloths were introduced (4–8 cloths per beaker) and the wash cycle begun (100 rpm). After washing 10 minutes, the cloths were rinsed for 1 minute, dried and their reflectances were recorded using a Gardener reflectometer (Model Colorgard System 05). Using the reflectances of the clean, soiled and washed cloths, the % detergency was calculated according to the following relationship:

$$\% \text{ Detergency} = \frac{R_{washed} - R_{soiled}}{R_{clean} - R_{soiled}} \times 100$$

As the effectiveness of the detergent formulation improves, the percentage detergency increases.

The detergency results are given in Table VI for clay soil and fatty particulate type cloths at three water hardnesses. It is clear from these results that F/MA copolymer and terpolymer provide substantial detergency building across all water hardnesses. They are similar in effectiveness to sodium tripoly, phosphate (STP) as well as Sokalan CP-7.

Additionally, the results set forth in Table VI demonstrate that the polymers of the present invention are effective when used in formulations containing calcium sensitive anionic surfactants.

TABLE VI

| Soil | ppm $Ca^{++}$ (Water | % Detergency Single Active Anionic Surfactant Formulation[a] | | | | | |
|---|---|---|---|---|---|---|---|
| Type Cloth | Hardness) | 1 | 2 | 3 | 4 | 5 | 6 |
| Fatty Particulate | 60 | 45.4 | 50.5 | 50.6 | 49.9 | 48.0 | 47.1 |
| | 120 | 37.4 | 49.6 | 51.0 | 50.0 | 49.4 | 45.5 |
| | 180 | 35.3 | 45.6 | 48.0 | 43.0 | 45.7 | 37.0 |
| Clay | 60 | 35.3 | 69.1 | 68.7 | 66.5 | 67.8 | 64.8 |

TABLE VI-continued

| Soil Type Cloth | ppm $Ca^{++}$ (Water Hardness) | % Detergency Single Active Anionic Surfactant Formulation[a] 1 | 2 | 3 | 4 | 5 | 6 |
|---|---|---|---|---|---|---|---|
| | 120 | 32.5 | 64.8 | 66.3 | 58.6 | 60.5 | 59.1 |
| | 180 | 28.6 | 43.6 | 57.9 | 34.2 | 40.3 | 54.5 |

[a]See Table V and Example 5 for description of these detergent formulations.

EXAMPLE 6

This example illustrates the preparation and detergency of household laundry detergent compositions employing the builder polymers (including unoxidized F/MA polymers) listed in Table V in the following mixed surfactant formulations:

Mixed Surfactant Formulations-A

| Component | % by Weight in Formulation, Formula No: 1 | 2 | 3 | 4 |
|---|---|---|---|---|
| Na $C_{11}$-$C_{15}$ Alkylbenzene Sulfonate | 10 | 10 | 10 | 10 |
| Na Alcohol Ethoxy (7EO) Sulfate[b] | 5 | 5 | 5 | 5 |
| Sodium Carbonate | 18 | 18 | 30 | 18 |
| Sodium Silicate | 15 | 15 | 15 | 15 |
| Sodium Sulfate | 27 | 27 | 32 | 27 |
| Sodium tripolyphosphate | — | 25 | — | — |
| [a]F/MA Copolymer | — | — | 25 | — |
| [a]F/MA Terpolymer A (Acrylic Acid) | — | — | — | 25 |

[a]Weight percentage of sodium salt of polymer.
[b]Sulfated Alfonic ® 1412-70.

Mixed Surfactant Formulations-B

| Component | % by Weight in Formulation, Formula No.: 1 | 2 | 3 | 4 | 5 | 6 |
|---|---|---|---|---|---|---|
| Na Alkylbenzene Sulfonate (C13) | 10 | 10 | 10 | 10 | 10 | 10 |
| Alcohol Ethoxylate[b] | 5 | 5 | 5 | 5 | 5 | 5 |
| Sodium Carbonate | 18 | 18 | 18 | 18 | 18 | 18 |
| Sodium Silicate | 5 | 5 | 5 | 5 | 5 | 5 |
| Sodium Sulfate | 47 | 47 | 47 | 42 | 42 | 42 |
| Sodium Citrate | 10 | 10 | 10 | — | — | — |
| Zeolite 4A | — | — | — | 15 | 15 | 15 |
| [a]F/MA Copolymer | — | 5 | — | — | 5 | — |
| [a]F/MA Terpolymer A (Acrylic Acid) | — | — | 5 | — | — | 5 |

[a]Weight percentage of sodium salt of polymer.
[b]Alfonic ® 1412-70 (12-14C alcohol ethoxylate containing 70% ethylene oxide by weight).

Detergency evaluations were by the method set forth in Example 5, except that only 120 ppm water hardness was used for all samples and Fatty/Particulate and Fatty/Oily type cloths were used for Mixed Surfactant Formulations-A testing. Citrate builders, which are commercially used in liquid detergent formulations, were employed as a control.

Results are shown in Table VII. The unoxidized F/MA polymer builders improve detergency of mixed surfactant formulations for household laundry use over a range of laundry soil types. The unoxidized F/MA polymers are more effective than the citrate or zeolite controls which are used commercially in liquid detergents.

TABLE VII

| Mixed Surfactant Formula No.[b] | Percentage Detergency: Clay/Particulate Soil[a] | Fatty/Particulate Soil[a] | Fatty/Oily Soil[a] |
|---|---|---|---|
| A | | | |
| 1 Control/No Builder | — | 40.1 | 41.7 |
| 2 Phosphate | — | 49.1 | 50.2 |
| 3 F/MA Copolymer | — | 46.8 | 47.9 |
| 4 F/MA Terpolymer A | — | 46.0 | 49.0 |
| B | | | |
| 1 Control/Citrate | 42.1 | 39.4 | — |
| 2 F/MA Copolymer | 50.2 | 41.7 | — |
| 3 F/MA Terpolymer A | 47.8 | 40.8 | — |
| 4 Control/Zeolite | 42.4 | 41.0 | — |
| 5 F/MA Copolymer | 49.4 | 43.1 | — |
| 6 F/MA Terpolymer A | 49.6 | 43.9 | — |

[a]Cloths washed in 120 ppm water hardness.
[b]See Example 6 and Table V for description of formulation ingredients.

EXAMPLE 7

This example illustrates the preparation and detergency of household laundry detergent compositions employing the anhydride form of the unoxidized F/MA polymers as builders.

Detergent compositions were prepared according to the following formulations:

Anhydride and Sodium Salt Formulations

| Component | % by Weight in Formulation, Formula No: 1 | 2 | 3 | 4 | 5 | 6 |
|---|---|---|---|---|---|---|
| Na Alkyl Benzene Sulfonate (C13) | 5 | 5 | 5 | 5 | 5 | 5 |
| Sodium Carbonate | 30 | 30 | 30 | 30 | 30 | 30 |
| Sodium Silicate | 20 | 20 | 20 | 20 | 20 | 20 |
| Sodium Sulfate | 35 | 30 | 9.8 | 9.3 | 14.5 | 14.1 |
| Sodium Tripolyphosphate | — | 25 | — | — | — | — |
| F/MA Copolymer | | | | | | |
| (as Na Salt) | — | — | — | 25 | — | — |
| (as Anhydride) | — | — | 18.33 | — | — | — |
| F/MA Terpolymer A (Acrylic Acid) | | | | | | |
| (as Na Salt) | — | — | — | — | — | 25 |
| (as Anhydride) | — | — | — | — | 17.75 | — |

Detergency evaluations were conducted by the method of Example 5, except that:

1) In formulations 3 and 5 the builder was used as a solid anhydride added directly to the wash water;
2) All washes were 14 minutes at 40° C., 100 rpm and a 2:1 ratio of $Ca^{++}$: $Mg^{++}$ water hardness;
3) Fatty/Particulate and Clay/Particulate cloths were tested; and
4) The pH of the wash water was measured after 2 and 7 minutes Results are shown in Table VIII.

TABLE VIII

| Anhydride or Salt Formula No. | Percentage Detergency: Clay/Partiaculate Soil[a] | Fatty/Particualate Soil[a] |
|---|---|---|
| 1 Control/No Builder | 43.4 | 47.1 |
| 2 Phosphate | 67.3 | 52.8 |
| 3 F/MA Copolymer Anhydride | 49.1 | 45.6 |
| 4 F/MA Copolymer Na Salt | 62.5 | 50.8 |
| 5 F/MA Terpolymer A[b] Anhydride | 59.5 | 50.4 |

TABLE VIII-continued

| Percentage Detergency | | |
|---|---|---|
| Anhydride or Salt Formula No. | Clay/ Partiaculate Soil[a] | Fatty/ Particualate Soil[a] |
| 6 F/MA Terpolymer A[b] Na Salt | 66.4 | 53.2 |

[a]Cloths washed in 120 ppm water hardness.
[b]Acrylic acid comonomer.

EXAMPLE 8

This example illustrates the preparation and detergency of household laundry detergent compositions employing various F/MA polymers as builders. Additionally, this example illustrates the use of monoethanolamine, a common organic alkalinity control agent useful in the formulation of liquid detergents.

Detergent compositions were prepared according to the following formulations:

Formulations Containing F/MA Terpolymers

| Component | % by Weight in Formulation Formula No: 1 | 2 | 3 | 4 | 5 |
|---|---|---|---|---|---|
| Na Alkylbenzene Sulfonate (C11) | 17 | 17 | 17 | 17 | 17 |
| Neodol ® 25-9 | 7 | 7 | 7 | 7 | 7 |
| Monoethanolamine | 2 | 2 | 2 | 2 | 2 |
| Sodium Sulfate | 49 | 49 | 49 | 49 | 74 |
| Sodium Citrate | 25 | | | | |
| [a] Terpolymer C (Isobutyl Vinyl Ether) | | 25 | | | |
| [a] Terpolymer D (Methyl Acrylate) | | | 25 | | |
| [a] Terpolymer B (Vinyl Acetate) | | | | 25 | |

[a] Weight percentage of sodium salt of polymer.

Detergency evaluations were conducted as in Example 5, except that Clay/Particulate and Fatty/Particulate Soil cloths were washed at 120 ppm water hardness. Results are shown in Table IX.

TABLE IX

| Percentage Detergency | |
|---|---|
| F/MA Terpolymer Formula No. | Clay/Particualate Soil[a] |
| 1 Control/Citrate | 52.8 |
| 2 F/MA Terpolymer C[b] | 48.1 |
| 3 F/MA Terpolymer D[c] | 46.3 |
| 4 F/MA Terpolymer B[d] | 43.0 |
| 5 Control/No Builder | 42.9 |

[a]Cloths washed in 120 ppm water hardness.
[b]F/MA terpolymer builder containing isobutyl vinyl ether.
[c]F/MA terpolymer builder containing methyl acrylate.
[d]F/MA terpolymer builder containing vinyl acetate.

The results show that unoxidized F/MA terpolymers are effective detergent builders in monoethanolamine-containing detergent formulations.

EXAMPLE 10

This example illustrates the preparation of liquid household laundry detergent compositions employing the builders disclosed herein.

Liquid detergent compositions for household laundry use are prepared according to the following formulations:

Liquid Laundry Detergents

| Component | % by Weight in Formulation Formula No: 1 | 2 | 3 | 4 | 5 | 6 |
|---|---|---|---|---|---|---|
| Actives | | | | | | |
| Sodium $C_{11}$-$C_{15}$ Alkylbenzene Sulfonate | 8 | 17 | 10 | | | 7 |
| Alcohol Ethoxy Sulfate[a] | 12 | | 6 | | | 1 |
| Alcohol Ethoxylate[b] | 8 | 7 | 8 | 16 | 8 | 4 |
| Alkylpolyglycoside[c] | | | | | 16 | 15 |
| Builders | | | | | | |
| Trisodium Citrate | 0-15 | 0-15 | 0-10 | 0-20 | 10 | 10 |
| Soap | 0-10 | 0-15 | | | 5 | 4 |
| Carboxymethyloxysuccinate, trisodium | | | | | 10 | 0-20 |
| Oxydisuccinate, tetrasodium | | | | | | 6 |
| F/MA Polymers | 5-15 | 2-20 | 2-15 | 1-10 | 5 | 2-15 |
| Buffers | | | | | | |
| Monoethanolamine | 1 | 2 | 2 | 0-4 | | 2 |
| Triethanolamine | | | 2 | | 4 | 4 |
| Sodium Carbonate | | | | | | 1 |
| Enzymes | | | | | | |
| Protease (Savinase, Alcalase, etc.) | 1 | — | 1 | 0.5 | 1 | 0.75 |
| Amylase (Termamyl) | 0.5 | — | — | 0.5 | 1 | 0.5 |
| Lipase (Lipolase) | 1 | — | — | 0.5 | 1 | 1 |
| Enzyme Stabilizers | | | | | | |
| Borax Pentahydrate | | | 3.5 | | 4 | 4 |
| Glycerol | | | 4 | | 6 | 5 |
| Propylene Glycol | 10 | | | 10 | 2 | 5 |
| Formic Acid | 1 | | | 1 | | 1 |
| Calcium Chloride | 1 | | 1 | 1 | 1 | 1 |
| Softeners & Antistats | | | | | | |
| Quaternary Amines (Arquad 2HT) | | | | 2 | | |
| Ethoxylated Amine[d] | 1 | | | 2 | 1 | |
| Alkyldimethyl Amine Oxide[e] | | | | 1.5 | | |
| Compatibilizing Agents | | | | | | |
| Na Xylene Sulfonates | 3 | 6 | 3 | 2 | | 3 |

-continued

| Liquid Laundry Detergents | | | | | | |
|---|---|---|---|---|---|---|
| | % by Weight in Formulation | | | | | |
| | Formula No: | | | | | |
| Component | 1 | 2 | 3 | 4 | 5 | 6 |
| Ethanol | 10 | | 2 | 8 | 3 | 3 |
| Fluorescers Tinopal UNPA | 0.25 | 0.2 | 0.25 | 0.25 | 0.2 | 0.15 |
| Perfume | 0.2 | 0.15 | 0.1–0.3 | 0.2 | 0.25 | 0.1–0.25 |
| Water | To Balance | | | | | |

[a]Sulfated Alfonic ® 1412-60 (12-14 C alcohol ethoxylate, containing 60% ethylene oxide by weight, sodium salt.)
[b]Alfonic ® 1412-70 (12-14 C alcohol) ethoxylate.
[c]APG 300 (obtained from Horizon Chemical).
[d]Varonic ® U202 (obtained from Sherex Corporation).
[e]Ammonyx MO (obtained from Stepan Chemical).

EXAMPLE 11

This example demonstrates the compatibility and stability of the F/MA polymers in liquid detergent formulations.

The compatibility and stability of the builders listed in Table X, below, were evaluated in liquid detergent formulation "2" of Example 10. The formulations were blended and the compatibility was determined by visual observation, initially and after 24 hours. Builders which were not compatible became hazy, precipitated or separated into different phases. Compatible builders remained in a clear, dispersed state. Unstable builders lost compatibility upon storage for 24 hours.

Because the acid form of the oxidized F/MA copolymer was employed, additional samples of oxidized F/MA copolymer were tested in formulations which were adjusted for pH by the addition of a base. In one sample the pH of the copolymer was adjusted before addition to the formulation and in a second sample, the pH was adjusted after addition of the copolymer to the formulation (employing either NaOH or monoethanolamine as the base). Only the sample in which the pH was adjusted after addition of the copolymer to the formulation displayed compatibility and stability. This and other results of compatibility tests are shown in Table X.

The results show that the F/MA copolymers are as compatible and stable as sodium citrate in a typical liquid detergent formulation. Sokalan CP-45, which cannot be used in liquid detergents at higher percentages, was hazy and formed a precipitate even at a relatively low percentage (5%)

TABLE X

| Liquid Detergent Compatibility | | | | |
|---|---|---|---|---|
| | % in | | Observations | |
| Builder | formulation[a] | pH | Initial | 24 hour |
| Oxidized F/MA[b] | | | | |
| Acid[c] form | 4 | 4.2 | Hazy | Hazy gel |
| Acid[c] form | 8 | 4.2 | Hazy | Hazy gel |
| Acid[c] form | 10 | 3.8 | Hazy | Hazy gel |
| Salt[d] form | 10 | 10.1 | Phased | Phased |
| Salt[e] form | 10 | 10.5 | Clear | Clear |
| Salt[f] form | 10 | 10.5 | Clear | Clear |
| Unoxidized F/MA[g] | | | | |
| Salt[h] form | 10 | 10.1 | Phased | Phased |
| Controls | | | | |
| Sodium Citrate | 10 | 10.1 | Clear | Clear |
| Sokalan ® CP-45[i] | 5 | 7.0 | Hazy | Precipitate |
| Sokalan ® CP-45[j] | 5 | 11.0 | Hazy | Precipitate |

[a]Formulation No. "2" of Example 10.
[b]A F/MA copolymer which was 95% oxidized by treatment with 44% nitric acid (see Table II).
[c]The copolymer was used without pH adjustment.
[d]The pH of the copolymer was adjusted to 10.1 with NaOH prior to addition to the detergent formulation.
[e]The pH of the copolymer was adjusted to 10.5 with NaOH after addition to the detergent formulation.
[f]The pH of the copolymer was adjusted to 10.5 with monoethanolamine after addition to the detergent formulation.
[g]A F/MA copolymer with a molecular weight of 10,000 (see Table IV).
[h]The sodium salt of the copolymer "g" prepared by neutralization of "g" with NaOH.
[i]A trademark of BASF Corporation, used for a partially neutralized sodium salt (pH 4.0) of maleic anhydride/acrylic acid copolymer.
[j]The copolymer of "i" which was neutralized to pH 11.0 by the addition of monoethanolamine.

EXAMPLE 12

This example illustrates the preparation of representative, powdered detergent compositions for general cleaning which employ the builders disclosed herein.

Household detergent compositions for general cleaning use are prepared according to the following formulations:

| | % by Weight in Formulation | | | | | |
|---|---|---|---|---|---|---|
| | Formula No: | | | | | |
| Component | 1 | 2 | 3 | 4 | 5 | 6 |
| Actives | | | | | | |
| Sodium $C_{11}$–$C_{13}$ Alkylbenazene Sulfonate | 11 | 11.5 | 17 | 11 | 15 | |
| Alcohol Ethoxy Sulfate[a] | | 5.5 | | | | |
| Primary Alcohol SuLfate | 10 | | | 9 | 5 | |
| Alcohol Ethoxylate[B] | | 3 | | 2 | 3 | 10 |
| Soap | 1 | | | | 1 | |
| Builders | | | | | | |
| Sodium Tripolyphosphate | | | | | 25 | |
| Aluminosilicates, e.g., Zeolite 4A | 10–35 | 0–15 | 5–20 | 0–12 | | |
| Polycarboxylate, e.g., CP-5 | 0–3 | | | | | |
| F/MA Polymers | 2–25 | 2–25 | 2–25 | 2–25 | 5 | 2–20 |
| Buffers | | | | | | |

-continued

| Component | % by Weight in Formulation | | | | | |
|---|---|---|---|---|---|---|
| | Formula No: | | | | | |
| | 1 | 2 | 3 | 4 | 5 | 6 |
| Alkaline Silicate | 2–5 | 20 | 5 | 3–20 | 15 | 15 |
| Sodium Carbonate | 18 | 18 | 15 | 30 | 20 | 40 |
| Enzymes | | | | | | |
| Protease (Savinase, Alcalase, etc.) | 0.5 | 0–1 | 0.5 | 0.5 | 1 | 1 |
| Amylase (Termamyl) | 0.4 | | | 0.5 | 0.5 | |
| Lipase (Lipolase) | 1.0 | 0–1 | | 0.5 | 1 | 1 |
| Softeners & Antistats | | | | | | |
| Quaternary Amines (Arquad 2HT) | | | 2.4 | | | |
| Ethoxylated Amine[c] | | | 2 | | | |
| Swelling Clay | | | 10 | | | |
| Fluorescers Tinopal AMS | 0.15 | 0.2 | 0.25 | 0.15 | 1.5 | 1.5 |
| Perfume | 0.1 | 0.2 | 0.1 | 0.1 | 0.1 | 0.1 |
| Fillers Na Sulfate | | | To Balance | | | |

[a]Sulfated Alfonic ® 1412-70 (b, Example 5).
[b]Neodo ® 25-9 (12-15C alcohol, 9 mole ethylene oxide condensate).
[c]Varonic ® U202 (obtained from Sherex Corporation).

Although emphasis has been placed on laundry detergent compositions in these examples, detergent compositions for all cleaning purposes are included within the scope of this invention. Various modifications and improvements on the compositions herein will become readily apparent to those skilled in the art. Accordingly, the scope and spirit of the invention are to be limited only by the claims and not by the foregoing specification.

We claim:

1. A detergent composition comprising from about 0.5 to 65% by weight of a surfactant and from about 1 to 80% by weight of a builder, wherein the builder is a polymer selected from the group consisting of:

a) a polymer derived from a polymer of furan and maleic anhydride, comprising a repeating unit of the structure:

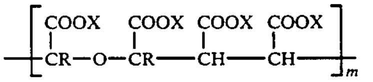

wherein R is H, $-CH_3$, $-CH_2CH_3$, or a combination thereof; X is H, or a salt forming cation, or a combination thereof; and m is at least 1;

b) a polymer derived from a polymer of furan, maleic anhydride and at least one copolymerized comonomer, comprising a repeating unit of the structure:

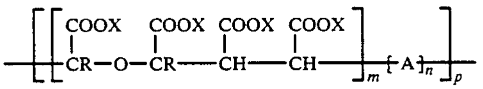

wherein A is a repeating unit derived from at least one copolymerized comonomer, selected from the group consisting of alkenyl alkyl ethers, alkyl acrylates, alkenyl carboxyalkyl ethers, vinyl esters of carboxylic acids, unsaturated carboxylic acids, unsaturated dicarboxylic acids and their anhydrides and esters, olefins and furan; R is H, $-CH_3$, $-CH_2CH_3$, or a combination thereof; X is H, or a salt forming cation, or a combination thereof; m is at least 1; n is greater than zero; and p is an integer from about 1 to 300; and c) combinations thereof.

2. The detergent composition of claim 1, wherein the builder is a polymer further comprising hydrolysis products of the polymer and salts thereof.

3. The detergent composition of claim 2, wherein the builder is a sodium potassium, ammonium, monoethanolamine or triethanolamine salt of the polymer.

4. The detergent composition of claim 1, wherein the builder is a polymer further comprising ester derivatives of a repeating unit derived from the maleic anhydride.

5. The detergent composition of claim 1, wherein the composition further comprises more than one surfactant.

6. The detergent composition of claim 1, wherein the composition further comprises at least one additional builder.

7. The detergent composition of claim 1, comprising from about 0.5 to 30% by weight of a surfactant and from about 1 to 65% by weight of a builder.

8. The detergent composition of claim 1, wherein the detergent composition is in liquid form.

9. The detergent composition of claim 8, wherein the detergent composition comprises from about 5 to 50% by weight surfactant(s), 1 to 55% by weight builder(s), 0.5 to 10% by weight buffer(s), and 1 to 15% by weight hydrotrope(s).

10. A method for washing fabric, comprising agitating the fabric in the presence of water and a detergent composition comprising from about 0.5 to 65% by weight of a surfactant and from about 1 to 80% by weight of a builder, wherein the builder is selected from the group consisting of:

a) a polymer derived from a polymer of furan and maleic anhydride comprising a repeating unit of the structure:

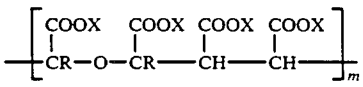

wherein R is H, $-CH_3$, $-CH_2CH_3$, or a combination thereof; X is H, or a salt forming cation, or a combination thereof; and m is at least 1;

b) a polymer derived from a polymer of furan, maleic anhydride and at least one copolymerized copolymer, comprising a repeating unit of the structure:

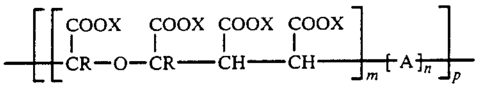

wherein A is a repeating unit derived from at least one copolymerized comonomer, selected from the group consisting of alkenyl alkyl ethers, alkyl acrylates, alkenyl carboxyalkyl ethers, vinyl esters of carboxylic acids, unsaturated carboxylic acids, unsaturated dicarboxylic acids and their anhydrides and esters, olefins and furan; R is H, $-CH_3$, $-CH_2CH_3$, or a combination thereof; X is H, or a salt forming cation, or a combination thereof; m is at least 1; n is greater than zero; and p is an integer from about 1 to 300; and c) combinations thereof.

* * * * *